United States Patent
Doyle et al.

(10) Patent No.: US 9,277,003 B2
(45) Date of Patent: *Mar. 1, 2016

(54) AUTOMATED CLOUD WORKLOAD MANAGEMENT IN A MAP-REDUCE ENVIRONMENT

(71) Applicant: International Business Machines Corporation, Armonk, NY (US)

(72) Inventors: Ronald P. Doyle, Raleigh, NC (US); David L. Kaminsky, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/823,335

(22) Filed: Aug. 11, 2015

(65) Prior Publication Data

US 2015/0350313 A1    Dec. 3, 2015

Related U.S. Application Data

(63) Continuation of application No. 12/642,659, filed on Dec. 18, 2009, now Pat. No. 9,141,433.

(51) Int. Cl.
*G06F 9/46* (2006.01)
*H04L 29/08* (2006.01)

(52) U.S. Cl.
CPC .......... *H04L 67/1008* (2013.01); *H04L 67/322* (2013.01)

(58) Field of Classification Search
None
See application file for complete search history.

(56) References Cited

U.S. PATENT DOCUMENTS

| | | |
|---|---|---|
| 6,829,765 B1 | 12/2004 | Chan et al. |
| 6,859,927 B2 | 2/2005 | Moody et al. |
| 7,379,888 B1 | 5/2008 | Mahapatro |
| 7,406,689 B2 | 7/2008 | Berstis et al. |
| 7,913,256 B2 | 3/2011 | Torii et al. |
| 8,156,500 B2 | 4/2012 | Helander |
| 8,635,622 B2 | 1/2014 | Daly et al. |

(Continued)

OTHER PUBLICATIONS

Author Unknown, Moab Workload Manager Administrator's Guide, Version 5.3, Online Book/Guide, 2009, pp. 1-1076, Cluster Resources, Inc., Published at http://www.clusterresources.com/products/mwm/docs/MWMAdminGuide5_3.pdf.

(Continued)

*Primary Examiner* — Gregory A Kessler
(74) *Attorney, Agent, or Firm* — Lee Law, PLLC; Christopher B. Lee

(57) ABSTRACT

A computing device associated with a cloud computing environment identifies a first worker cloud computing device from a group of worker cloud computing devices with available resources sufficient to meet required resources for a highest-priority task associated with a computing job including a group of prioritized tasks. A determination is made as to whether an ownership conflict would result from an assignment of the highest-priority task to the first worker cloud computing device based upon ownership information associated with the computing job and ownership information associated with at least one other task assigned to the first worker cloud computing device. The highest-priority task is assigned to the first worker cloud computing device in response to determining that the ownership conflict would not result from the assignment of the highest-priority task to the first worker cloud computing device.

22 Claims, 5 Drawing Sheets

(56) References Cited

U.S. PATENT DOCUMENTS

| | | | |
|---|---|---|---|
| 2004/0006589 | A1 | 1/2004 | Maconi et al. |
| 2004/0210627 | A1 | 10/2004 | Kroening |
| 2005/0283786 | A1 | 12/2005 | Dettinger et al. |
| 2006/0184626 | A1 | 8/2006 | Agapi et al. |
| 2007/0143765 | A1 | 6/2007 | Aridor et al. |
| 2008/0052716 | A1 | 2/2008 | Theurer |
| 2009/0138551 | A1 | 5/2009 | Hubbard |
| 2009/0260012 | A1 | 10/2009 | Borghetti et al. |
| 2009/0299920 | A1 | 12/2009 | Ferris et al. |

OTHER PUBLICATIONS

Author Unknown, Introduction to Parallel Programming and MapReduce, Website/page, Printed from Website on Oct. 18, 2009, pp. 1-5, Google Code University, Google Inc., Published at http://code.google.com/edu/parallel/mapreduce-tutorial.html.

Author Unknown, MapReduce—Wikipedia, the free encyclopedia, Website/page, Printed from Website on Oct. 18, 2009, pp. 1-7, Wikimedia Foundation, Inc., Published at http://en.wikipedia.org/wiki/MapReduce.

United States Patent and Trademark Office, Office Action for U.S. Appl. No. 12/642,659, May 1, 2012, pp. 1-17, Alexandria, VA, USA.

United States Patent and Trademark Office, Office Action for U.S. Appl. No. 12/642,659, Aug. 3, 2012, pp. 1-16, Alexandria, VA, USA.

United States Patent and Trademark Office, Office Action for U.S. Appl. No. 12/642,659, Nov. 20, 2012, pp. 1-16, Alexandria, VA, USA.

United States Patent and Trademark Office, Notice of Allowance for U.S. Appl. No. 12/642,659, May 13, 2015, pp. 1-9, Alexandria, VA, USA.

United States Patent and Trademark Office, Office Action for U.S. Appl. No. 13/434,768, Feb. 6, 2014, pp. 1-27, Alexandria, VA, USA.

United States Patent and Trademark Office, Notice of Allowance for U.S. Appl. No. 13/434,768, May 15, 2014, pp. 1-5, Alexandria, VA, USA.

US 9,277,003 B2

AUTOMATED CLOUD WORKLOAD MANAGEMENT IN A MAP-REDUCE ENVIRONMENT

BACKGROUND

The present invention relates to cloud computing environments. More particularly, the present invention relates to automated cloud workload management in a map-reduce environment.

Cloud computing environments often include a master computing device and multiple worker computing devices. Work is distributed from the master computing device into the cloud and to the worker computing devices within the cloud. The worker computing devices perform the work and return the results to the master computing device. The master computing device assembles the results received from the worker computing devices.

SUMMARY

A method includes identifying, via a computing device associated with a cloud computing environment, a first worker cloud computing device from a plurality of worker cloud computing devices with available resources sufficient to meet required resources for a highest-priority task associated with a computing job comprising a plurality of prioritized tasks; determining, based upon ownership information associated with the computing job and ownership information associated with at least one other task assigned to the first worker cloud computing device, whether an ownership conflict would result from an assignment of the highest-priority task to the first worker cloud computing device; and assigning the highest-priority task to the first worker cloud computing device in response to determining that the ownership conflict would not result from the assignment of the highest-priority task to the first worker cloud computing device.

An alternative method includes receiving, at a worker cloud computing device within a cloud computing environment, an indication of an available computing job comprising ownership information and priority information; determining available resources of the worker cloud computing device; determining ownership information for a task associated with another computing job presently being processed by the worker cloud computing device; and selecting a highest-priority task associated with the computing job for execution in response to determining that the available resources of the worker cloud computing device are sufficient to meet required resources for the highest-priority task without causing an ownership conflict between the computing job and the other computing job presently being processed by the worker cloud computing device.

A system includes a memory and a processor programmed to: retrieve a computing job from the memory; identify a first worker cloud computing device from a plurality of worker cloud computing devices with available resources sufficient to meet required resources for a highest-priority task associated with the computing job comprising a plurality of prioritized tasks; determine, based upon ownership information associated with the computing job and ownership information associated with at least one other task assigned to the first worker cloud computing device, whether an ownership conflict would result from an assignment of the highest-priority task to the first worker cloud computing device; and assign the highest-priority task to the first worker cloud computing device in response to determining that the ownership conflict would not result from the assignment of the highest-priority task to the first worker cloud computing device.

A computer program product comprises a computer-readable storage medium including computer-readable program code, where the computer-readable program code when executed on a computer causes the computer to: identify a first worker cloud computing device from a plurality of worker cloud computing devices with available resources sufficient to meet required resources for a highest-priority task associated with a computing job comprising a plurality of prioritized tasks; determine, based upon ownership information associated with the computing job and ownership information associated with at least one other task assigned to the first worker cloud computing device, whether an ownership conflict would result from an assignment of the highest-priority task to the first worker cloud computing device; and assign the highest-priority task to the first worker cloud computing device in response to determining that the ownership conflict would not result from the assignment of the highest-priority task to the first worker cloud computing device.

DETAILED DESCRIPTION

Figure 1:
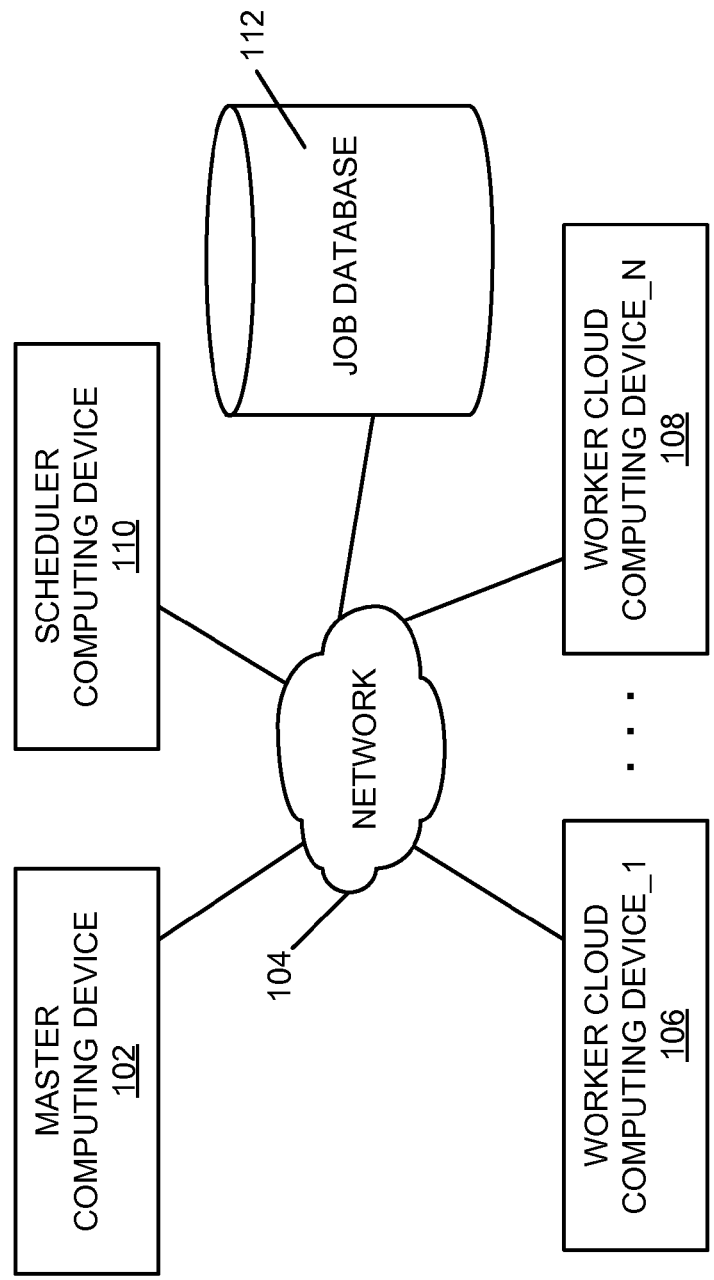
FIG. 1 is a block diagram of an example of an implementation of a cloud computing system for automated cloud workload management in a map-reduce environment according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated cloud workload management in a map-reduce environment. Jobs received by a master computing device in a cloud computing environment include ownership information and priority information. Alternatively, the job may include an indication of where this information may be found, or the information may be stored in an identified or configured location. Available idle resources within worker cloud computing devices are identified. Ownership information for tasks already associated with another computing job presently assigned to worker cloud computing devices is determined. Tasks are assigned based upon priority and ownership to cause highest-priority tasks to execute with highest-available resources among the various worker cloud computing devices without ownership conflict at any particular worker cloud computing device.

The highest-priority task may be identified with a priority indication such as text-based indication (e.g., "high," "medium," or "low"), by an integer value, or by another priority indicator appropriate for a given implementation. Priority may also be computed from factors associated with a given task or job. Examples of such factors include factors such as a required completion date or time, a highest payment for completion of the job or task, a type of job or task (e.g., payroll computation), or any other characteristic of or characteristic associated with the task or job. Many other types of factors from which priority of tasks and jobs may be computed are possible and all are considered within the scope of the present subject matter.

An ownership conflict may result, for example, where two entities (e.g., banks) have requested work from a cloud computing system and one or both of the entities does not want its work commingled with work of the other entity at a single cloud computing device within the cloud computing system. Ownership conflicts may also arise for work owned by the same entity. For example, a company may require that tasks involving sensitive data (e.g., human resources or other sensitive data) cannot be co-located with any other workload. In any such situation, concurrent selection or assignment of tasks associated with jobs from both entities or from a single entity with sensitive data requirements to a single worker cloud computing device would result in an ownership conflict. The present subject matter addresses ownership conflicts in the context of prioritized task selection and assignment to multiple worker cloud computing devices within a cloud computing environment.

Highest-priority tasks associated with the computing job are assigned to a worker cloud computing device when the available resources for the worker cloud computing device are sufficient to meet required resources for the highest-priority task without creating an ownership conflict. As such, work is assigned to the individual worker cloud computing devices to utilize the available idle resources associated with the respective worker cloud computing device and to avoid ownership conflicts with the work assignments for any given worker cloud computing device.

The present subject matter may be utilized within cloud computing environments, such as a MapReduce parallel processing cloud computing environment. MapReduce allows for distributed parallel processing of the map and reduction operations associated with jobs that are processed by the cloud computing environment. Work is assigned (e.g., mapped) to worker computing devices in the cloud, and collected (e.g., reduced) by a master computing device to form the processed result set.

To further clarify some language utilized in association with the present description, a master computing device in a cloud computing environment processes jobs. A job, hereinafter referred to as a computing job, represents an application or a logical subset of a large application to carry out a particular set of computing operations within the cloud computing environment. A computing job consists of both Map and Reduce processing phases. The master computing device partitions the computing jobs into one or more tasks. A task is a piece of work performed for the Map phase in association with a computing job. A worker cloud computing device executes the Map function for tasks associated with one or more computing jobs and returns results of its execution to the master computing device for consolidation with other results associated with the computing job.

The present subject matter applies value awareness to scheduling of tasks for worker cloud computing devices by prioritizing work that is distributed without ownership conflict to the various worker computing devices in the cloud. For example, certain customers of cloud computing environment processing may have contracts that guarantee the customers a certain amount of processing time. These customers may be associated with higher revenues. Alternatively, certain computing jobs may have deadlines for execution and delayed processing may result in financial penalties to the cloud computing environment owner. As another alternative, one customer may provide lower revenues, but have higher penalties. Value awareness may be arranged by contract or other relationships between a cloud computing environment owner and a customer. Many other possibilities exist for creation of computing job and task prioritization for cloud computing processing and all are considered within the scope of the present subject matter.

By applying value awareness to ownership conflict prevention, the present subject matter may increase the value of and revenue for a cloud computing environment. As such, a net economic benefit associated with a cluster/cloud may be improved. Further, an economic benefit factor or indication of net economic benefit may be associated with each computing job or task. This net economic benefit may be distributed with a computing job or provided for look up in a directory or other storage structure. Further, the master computing device or the worker cloud computing devices may cache information on net economic benefit. Many other possibilities exist for providing access to value awareness associated with computing jobs and all are considered within the scope of the present subject matter.

Computing jobs may be submitted by different parties, such as different banking institutions. Each of these different banking institutions may require that its computing jobs are not comingled with computing jobs from other banking institutions. Based upon the present subject matter, these computing jobs may be prioritized based upon value assessment of each computing job and may be assigned to different worker cloud computing devices to prevent ownership conflict for tasks at each worker cloud computing device. As such, the present subject matter applies to multi-tenancy computing environments to prevent ownership conflict for computing jobs from different business entities.

As such, to maximize financial benefit produced by the cloud, highest value computing jobs may be given preferential treatment. Further, by use of the automated cloud workload management in a map-reduce environment described herein, use of cloud computing resources may approach optimum without ownership conflict. For example, in a situation where a highest-priority computing job is input/output (I/O) intensive, more worker cloud computing devices may be assigned to tasks from this particular computing job. However, these worker cloud computing devices will often have idle central processing unit (CPU) time. This idle CPU time may be used to execute the highest-priority CPU-intensive computing job. Assignment of computing jobs and tasks may be performed to ensure that ownership conflict does not result from multiple tasks that are performed by any given worker cloud computing device.

For purposes of the present description, it is assumed that all worker cloud computing devices (e.g., nodes that do the mapped work/tasks) are heterogeneous. Heterogeneous refers to capabilities of each worker cloud computing device to operate concurrently on tasks from multiple computing jobs. As such, it is assumed the worker cloud computing devices have access to images and other information required to execute all tasks, and that they may concurrently execute tasks from multiple computing jobs.

The present subject matter may be implemented via a centralized scheduling approach or a distributed scheduling approach. For a centralized scheduling approach, the master computing device operates as a master scheduler to assign tasks to worker cloud computing devices. Alternatively, for a centralized scheduling approach, worker cloud computing devices may consult with the master computing device to determine which tasks to execute. For a distributed scheduling approach, tasks may be augmented with attributes used by workers to select appropriate tasks for processing. With the distributed scheduling approach, the worker cloud computing devices may select tasks to execute based upon their own resource availability (e.g., I/O or CPU availability). The worker cloud computing devices may also select highest-priority tasks for execution while ensuring that no ownership conflict results from tasks executed by the worker cloud computing device.

The present subject matter applies to both centralized and distributed scheduling approaches. However, the detailed examples described below are directed primarily to the centralized approach. It is understood that appropriate modifications to the examples described herein may be implemented by a person of ordinary skill upon consideration of the present description.

For either a centralized or a distributed scheduling implementation, computing jobs and tasks may include resource consumption indicators that provide an indication of priority (e.g., high/medium/low) and an indication of resource consumption (e.g., CPU=low; I/O=high). Computing jobs and tasks may also include ownership information and processing constraints (e.g., an identifier indicative of "No Co-processing With Other Bank Jobs").

For a distributed scheduling implementation, tasks may be created and provided with all of the resource consumption indicators received by a master computing device in association with a computing job to allow the worker cloud computing devices to determine which computing jobs to select based upon the original resource consumption indicators. For a centralized scheduling implementation, ownership conflict and prioritization of tasks may be determined by the master computing device and a subset of the resource consumption indicators may be passed to the worker cloud computing device to allow the worker cloud computing device to perform further prioritization and resource optimization based upon actual resource availability at the respective worker cloud computing devices. Many other variations on resource consumption indicators and partitioning of responsibility between centralized and distributed scheduling are possible and all are considered within the scope of the present subject matter.

Each scheduling device (e.g., master computing device for a centralized implementation and a worker cloud computing device for a distributed implementation) executes the following higher-level assessments during the performance of its scheduling activities. The scheduling device assesses the resources currently available for task execution. For a centralized implementation, the master computing device requests resource availability information from the respective worker cloud computing devices. The scheduling device determines whether any tasks are available that require the available resources. If multiple such tasks exist, the scheduling device executes the highest-priority task without causing an ownership conflict at any processing device.

It should also be noted that additional communication and processing may be performed by worker cloud computing devices to be assigned (e.g., centralized scheduling) or to retrieve (e.g., distributed scheduling) another task from a computing job already in process. For example, if a worker cloud computing device has multiple processor cores or if a computing job has tasks that requiring different execution profiles (e.g., some tasks require more CPU resources while others require more I/O resources), then resource utilization and ownership conflict prevention efficiencies may further be improved by utilizing more of the available resources on a given worker cloud computing device.

It should further be noted that both centralized scheduling and distributed scheduling may have implementation benefits and each should be considered for any implementation. For example, for centralized scheduling, a better schedule may result given a centralized view of all available resources and computing jobs within a cloud computing environment. Alternatively, for distributed scheduling, communication overhead may be reduced by avoiding resource availability messaging from the worker computing environment computing devices to the master computing device. Further, hybrid approaches are possible, such as ownership conflict prevention scheduling at a centralized master computing device in combination with delegated task resource utilization scheduling distributed to the worker computing environment computing devices. As such, any and all combinations of scheduling and delegation of the various responsibilities described herein is considered within the scope of the present subject matter.

The automated cloud workload management in a map-reduce environment described herein may be performed in real time to allow prompt utilization of idle resources that are available within worker cloud computing devices that form a cloud computing environment. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a cloud computing system 100 for automated cloud workload management in a map-reduce environment. A master computing device 102 interconnects via a network 104 with a worker cloud computing device_1 106 through a worker cloud computing device_N 108. As described above, the worker cloud computing device_1 106 through a worker cloud computing device_N 108 represent heterogeneous computing devices capable of processing multiple tasks associated with multiple computing jobs. A scheduler computing device 110 may operate as a centralized scheduler within the cloud computing system 100 in certain implementations. It should be noted that the scheduler computing device 110 may be optional for implementations where the master computing device 102 performs centralized scheduling activities. As such, the description herein will focus primarily on the master computing device 102 performing the automated cloud workload management in a map-reduce environment described here. However, it is understood that this processing may be further partitioned and distributed between the master computing device 102 and the scheduler computing device 110 without departure from the scope and content of the present subject matter.

The master computing device 102, and/or the scheduler computing device 110 for certain implementations, partitions computing jobs into tasks and distributes tasks to the respective ones of the worker cloud computing device_1 106 through the worker cloud computing device_N 108 for processing during a map phase of processing. The master computing device 102 also receives results from all distributed tasks associated with particular computing jobs during a reduce phase of processing.

The master computing device 102, and/or the scheduler computing device 110 for certain implementations, may implement centralized scheduling of tasks to ensure that no ownership conflict results from processing at any of the heterogeneous worker cloud computing device_1 106 through worker cloud computing device_N 108. The master computing device 102 may implement centralized scheduling of tasks to ensure prioritized distribution of tasks based upon available resources at each of the worker cloud computing device_1 106 through the worker cloud computing device_N 108. Alternatively, distributed scheduling may be used by the master computing device 102 to distribute all or a portion of the automated cloud workload management in a map-reduce environment described herein to the respective worker cloud computing devices.

A job database 112 includes storage in the form of tables or other arrangements accessible by either the master computing device 102 and/or the worker cloud computing device_1 106 through the worker cloud computing device_N 108. It should be noted that while the job database 112 is shown as a single entity, the job database 112 may be located in association with a single computer or may be distributed and associated with multiple computers without departure from the scope of the present subject matter. The job database 112 stores information associated with each computing job in process by the cloud computing system 100. Computing jobs may be stored to the job database 112 by the master computing device 102, and/or the scheduler computing device 110 for certain implementations, or another device (not shown), in response to creation of computing jobs for processing within the cloud computing system 100.

As will be described in more detail below in association with FIGS. 2 through 5, the master computing device 102, and/or the scheduler computing device 110 for certain implementations, and/or the worker cloud computing device_1 106 through the worker cloud computing device_N 108 provide automated cloud workload management in a map-reduce environment. The automated cloud workload management in a map-reduce environment is based upon ownership information associated with computing jobs to avoid ownership conflicts at any of the respective worker cloud computing devices. The automated cloud workload management in a map-reduce environment is further based upon maximizing utilization of available resources at the respective worker cloud computing devices 106 through 108 without computing job ownership conflict.

It should be noted that the master computing device 102 and each of the worker cloud computing device_1 106 through the worker cloud computing device_N 108 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
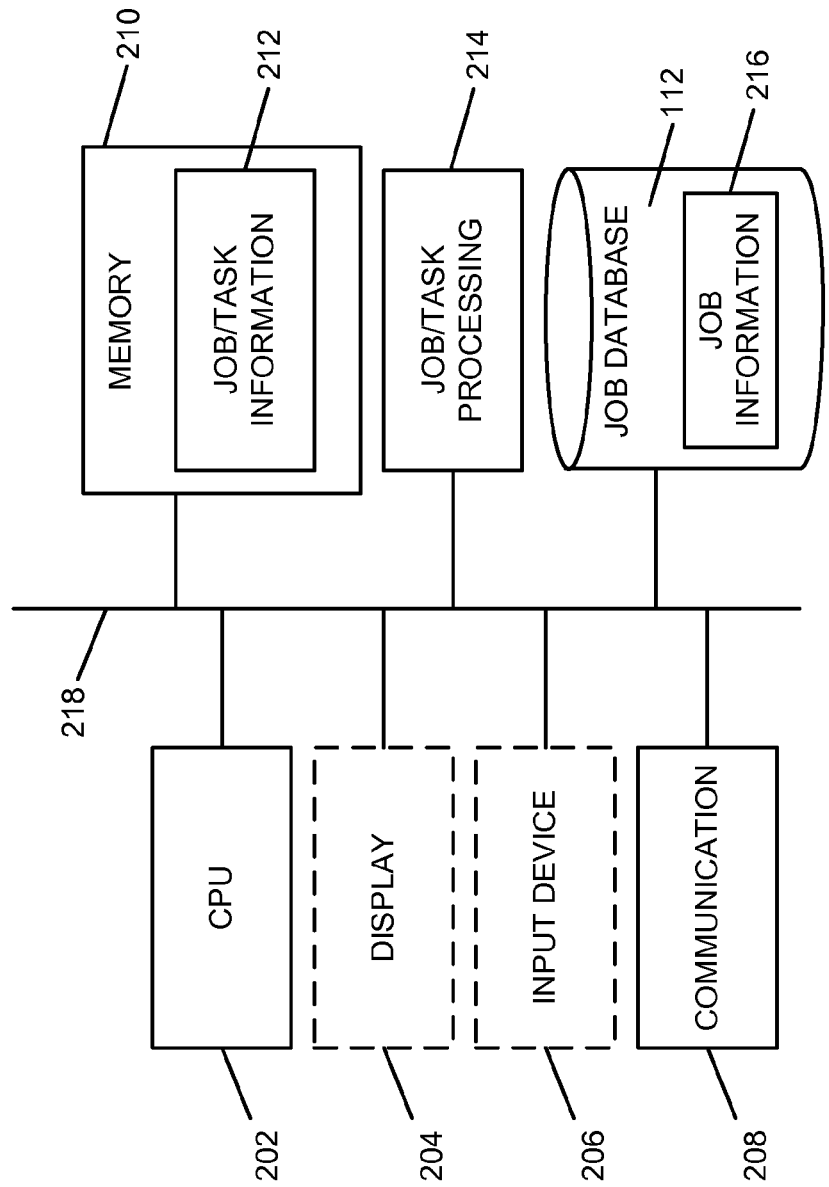
FIG. 2 is a block diagram of an example of an implementation of a core processing module capable of performing automated cloud workload management in a map-reduce environment according to an embodiment of the present subject matter.

FIG. 2 is a block diagram of an example of an implementation of a core processing module 200 capable of performing automated cloud workload management in a map-reduce environment. As such, the core processing module 200 may be implemented in association with the master computing device 102, and/or the scheduler computing device 110 for certain implementations, or in association with the worker cloud computing device_1 106 through the worker cloud computing device_N 108 to perform centralized or distributed processing, respectively. Alternatively, a variant of the core processing module 200 may be implemented in association with each of the master computing device 102 or in association with the worker cloud computing device_1 106 through the worker cloud computing device_N 108 to implement a hybrid distribution of processing, as described above.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without user configurability or feedback. However, the core processing module 200 may also provide user feedback and configurability via the display 204 and the input device 206, respectively.

A communication module 208 provides interconnection capabilities that allow the core processing module 200 to communicate with other modules within the cloud computing system 100. For example, when the core processing module 200 is associated with the master computing device 102, the communication module 208 allows communication with the worker cloud computing device_1 106 through the worker cloud computing device_N 108. Alternatively, when the core processing module 200 is associated with one of the worker cloud computing device_1 106 through the worker cloud computing device_N 108, the communication module 208 allows communication with the master computing device 102. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a job/task information storage area 212 that stores information associated with computing jobs, such as task partitioning, assignment information, and ownership information, for the core processing module 200. As will be described in more detail below, when the core processing module 200 is associated with the master computing device 102, the job/task information stored within the job/task information storage area 212 is used to, for example, partition computing jobs into tasks, and assign tasks associated with the computing jobs to worker cloud computing devices, such as the worker cloud computing device_1 106 through the worker cloud computing device_N 108, without ownership conflict. Additionally, the job/task information storage area 212 may be used to store available resource information for the respective worker cloud computing devices for a centralized scheduling approach.

Alternatively, when the core processing module 200 is associated with a worker cloud computing device, such as the worker cloud computing device_1 106 through the worker cloud computing device_N 108, the job/task information stored within the job/task information storage area 212 is used to store available resource information (e.g., I/O or CPU resource information), and to process assigned tasks. Additionally, for a distributed scheduling approach, the job/task information storage area 212 may be used to store ownership information for active computing jobs by a given worker cloud computing device for computing job ownership conflict prevention.

It should be noted that many possibilities exist for partitioning responsibility between the master computing device 102 and the respective worker cloud computing devices. Accordingly, any such responsibility partitioning between the respective devices is considered within the scope of the present subject matter.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, a code execution area, and a data area without departure from the scope of the present subject matter.

A job/task processing module 214 is also illustrated. The job/task processing module 214 provides task partitioning, task execution, computing job ownership resolution, and other processing for the core processing module 200, as described above and in more detail below. The job/task processing module 214 implements the automated cloud workload management in a map-reduce environment of the core processing module 200. It should further be noted that the processing provided by the job/task processing module 214 may be varied based upon whether a centralized scheduling approach or a distributed scheduling approach is implemented, as described above and in more detail below.

Though the job/task processing module 214 is illustrated as a component-level module for ease of illustration and description purposes, it should be noted that the job/task processing module 214 may include any hardware, programmed processor(s), and memory used to carry out the functions of this module as described above and in more detail below. For example, the job/task processing module 214 may include additional controller circuitry in the form of application specific integrated circuits (ASICs), processors, and/or discrete integrated circuits and components for performing communication and electrical control activities associated with the respective devices. Additionally, the job/task processing module 214 may also include interrupt-level, stack-level, and application-level modules as appropriate. Furthermore, the job/task processing module 214 may include any memory components used for storage, execution, and data processing for performing processing activities associated with the module.

It should also be noted that the job/task processing module 214 may form a portion of other circuitry described without departure from the scope of the present subject matter. Further, the job/task processing module 214 may alternatively be implemented as an application stored within the memory 210. In such an implementation, the job/task processing module 214 may include instructions executed by the CPU 202 for performing the functionality described herein. The CPU 202 may execute these instructions to provide the processing capabilities described above and in more detail below for the core processing module 200. The job/task processing module 214 may form a portion of an interrupt service routine (ISR), a portion of an operating system, a portion of a browser application, or a portion of a separate application without departure from the scope of the present subject matter.

The job database 112 is shown within FIG. 2 and is shown associated with the core processing module 200. As such, the job database 112 may be operatively coupled to the core processing module 200 as appropriate for a given implementation. As described above, the job database 112 provides storage capabilities for information associated with the automated cloud workload management in a map-reduce environment of the core processing module 200.

The job database 112 includes a job information storage area 216 that may be stored in the form of tables or other arrangements accessible by the core processing module 200. The job information storage area 216 includes information associated with active computing jobs, such as ownership information and priority information. As will be described in more detail below, computing job information stored within the job information storage area 216 is used to partition and assign tasks associated with computing jobs without ownership conflict.

The CPU 202, the display 204, the input device 206, the communication module 208, the memory 210, the job/task processing module 214, and the job database 112 are interconnected via an interconnection 218. The interconnection 218 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. It should also be understood that, though the job information storage area 216 is shown within the job database 112, computing job information may also be stored within the memory 210 without departure from the scope of the present subject matter. Accordingly, the core processing module 200 may take many forms and may be associated with many platforms.

Figure 3:
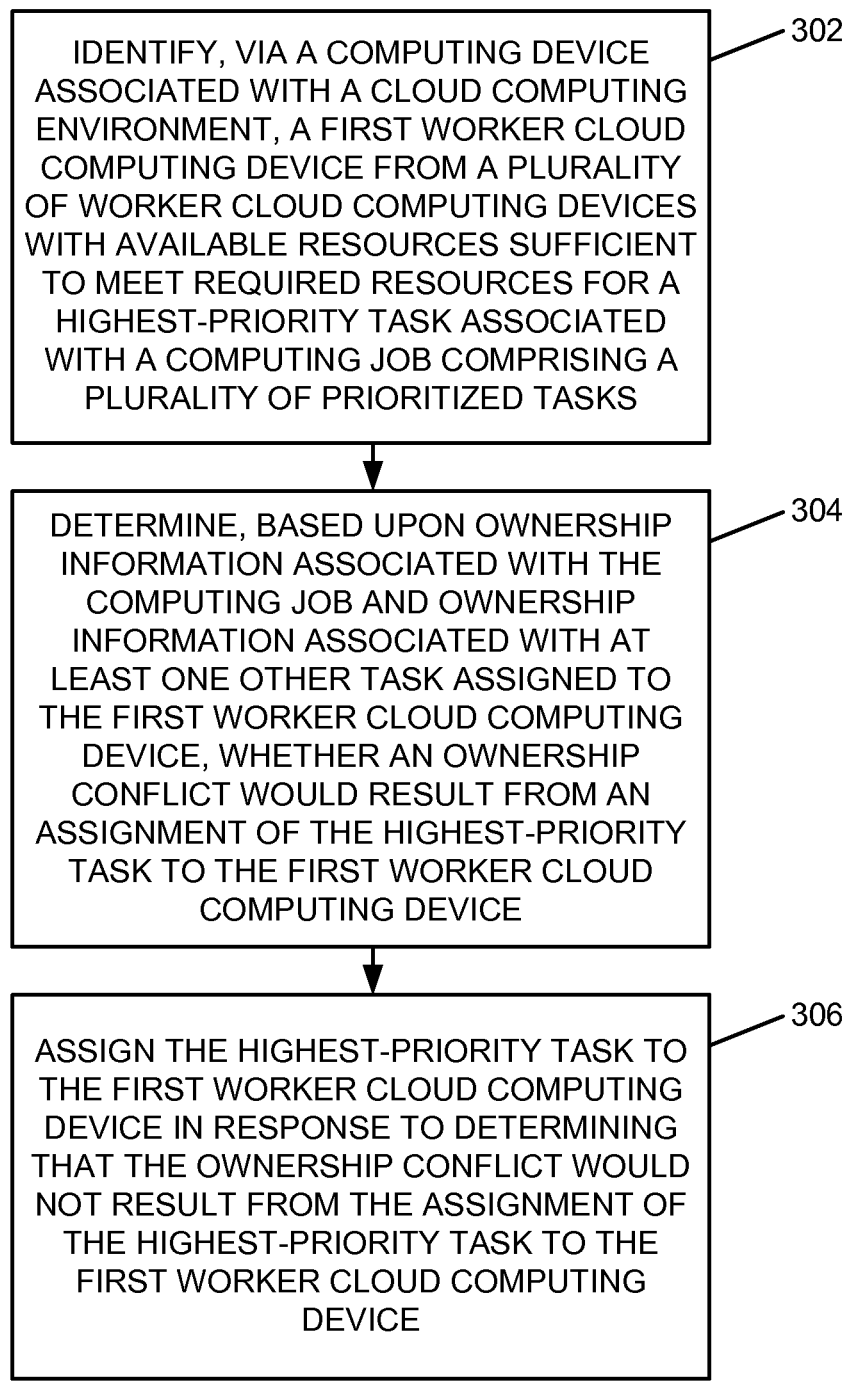
FIG. 3 is a flow chart of an example of an implementation of a process for automated cloud workload management in a map-reduce environment according to an embodiment of the present subject matter.
Figure 4:
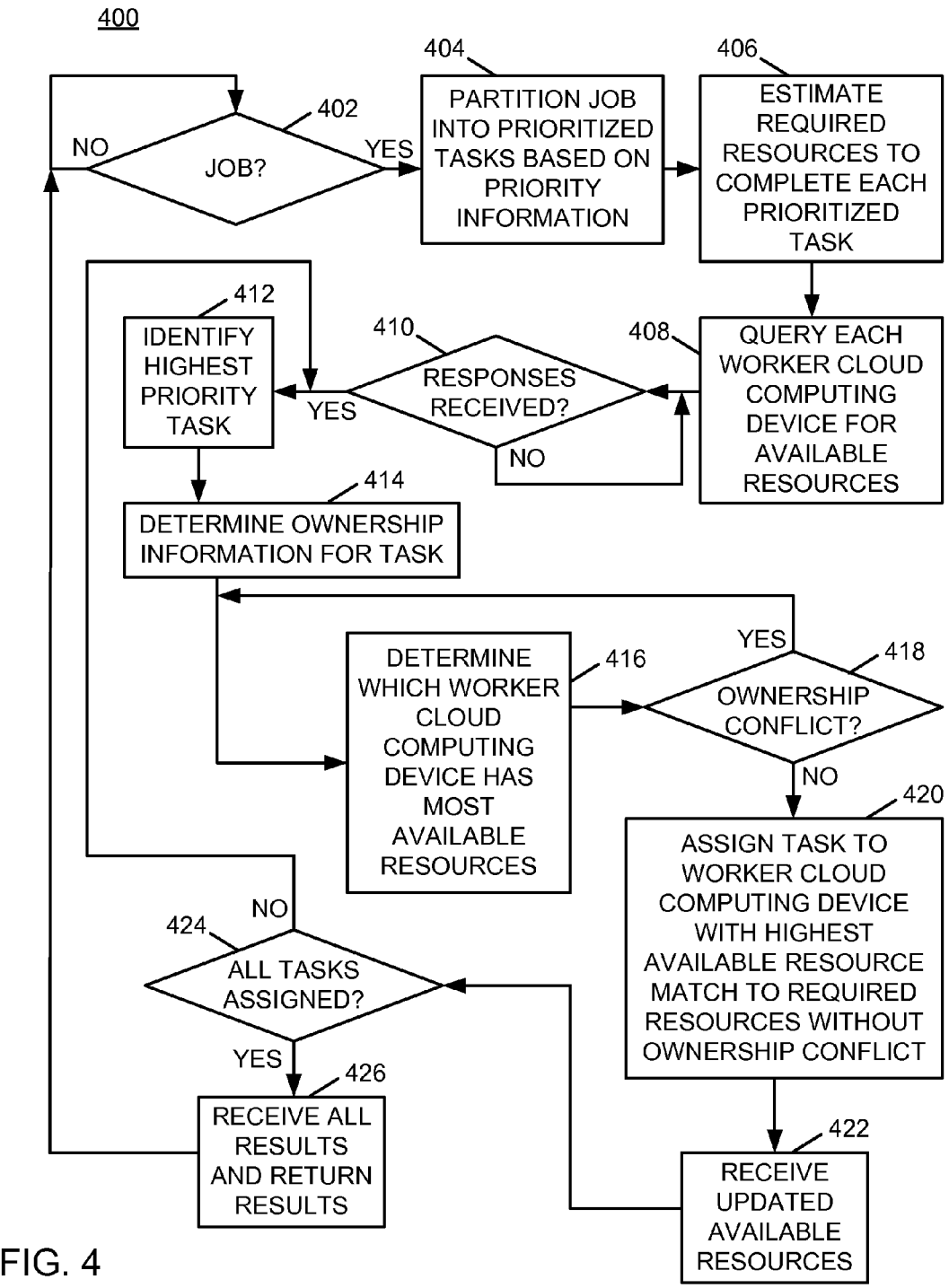
FIG. 4 is a flow chart of an example of an implementation of a process for automated cloud workload management in a map-reduce environment for centralized scheduling by a master or scheduler computing device according to an embodiment of the present subject matter.
Figure 5:
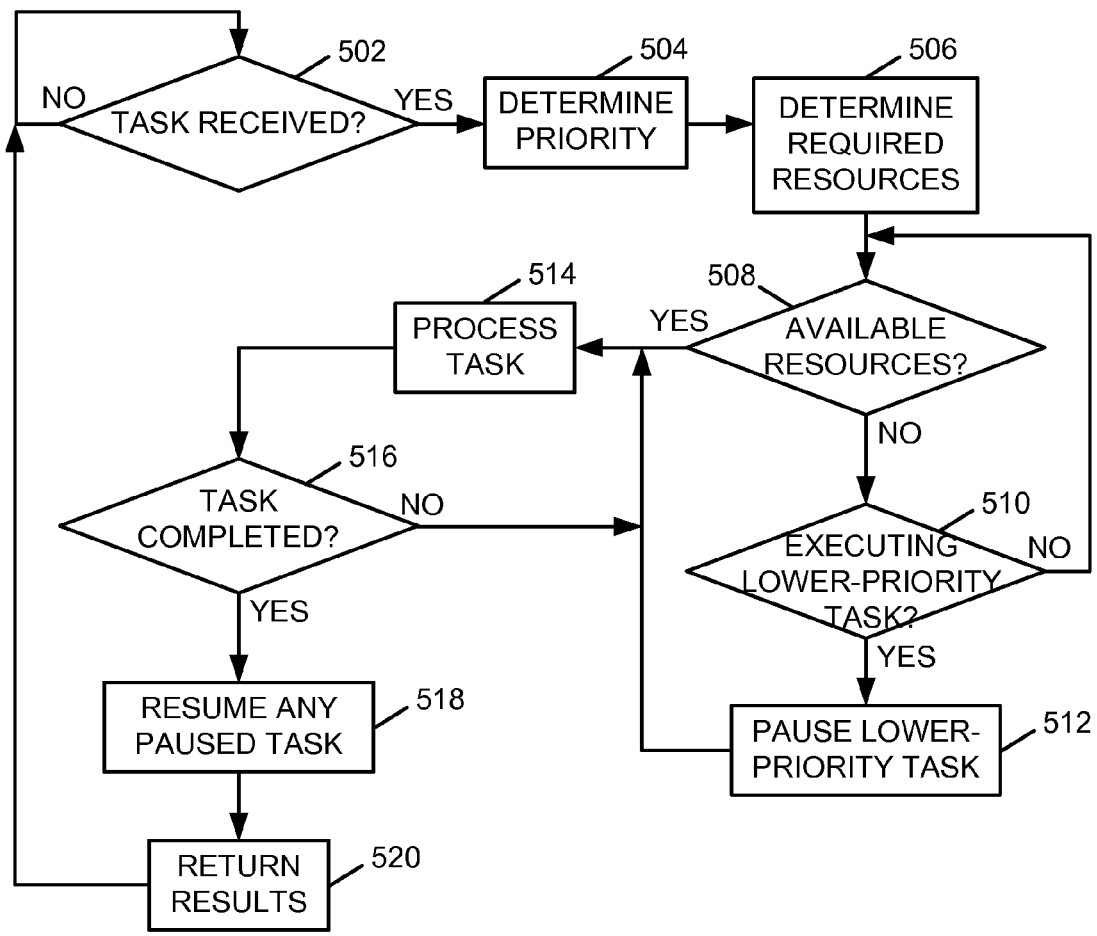
FIG. 5 is a flow chart of an example of an implementation of a process for automated cloud workload management in a map-reduce environment for hybrid scheduling by a worker cloud computing device where the worker cloud computing device performs task prioritization according to an embodiment of the present subject matter.

FIG. 3 through FIG. 5 below describe example processes that may be executed by devices, such as the core processing module 200, to perform the automated cloud workload management in a map-reduce environment associated with the present subject matter. Many other variations on the example processes are possible and all are considered within the scope of the present subject matter. The example processes may be performed by modules, such as the job/task processing module 214 and/or executed by the CPU 202, associated with devices that implement the core processing module 200. It should also be noted, as described above, that the core processing module 200 may be implemented in association with any of the respective devices described in association with FIG. 1, with processing variations as appropriate for a given implementation. It should be noted that time out procedures and other error control procedures are not illustrated within the example processes described below for ease of illustration purposes. However, it is understood that all such procedures are considered to be within the scope of the present subject matter. It should further be noted that many variations on the example processed described below are possible for variations between centralized and distributed scheduling approaches. As such, the example processes below may be modified and altered, as appropriate for a given implementation, to implement such variations.

FIG. 3 is a flow chart of an example of an implementation of a process 300 for automated cloud workload management in a map-reduce environment. At block 302, the process 300 identifies, via a computing device associated with a cloud computing environment, a first worker cloud computing device from a plurality of worker cloud computing devices with available resources sufficient to meet required resources for a highest-priority task associated with a computing job comprising a plurality of prioritized tasks. At block 304, the process 300 determines, based upon ownership information associated with the computing job and ownership information associated with at least one other task assigned to the first worker cloud computing device, whether an ownership conflict would result from an assignment of the highest-priority task to the first worker cloud computing device. At block 306, the process 300 assigns the highest-priority task to the first worker cloud computing device in response to determining that the ownership conflict would not result from the assignment of the highest-priority task to the first worker cloud computing device.

FIG. 4 is a flow chart of an example of an implementation of a process 400 for automated cloud workload management in a map-reduce environment for centralized scheduling by a master computing device, or a scheduler computing device, such as the master computing device 102, or the scheduler computing device 110. At decision point 402, the process 400 makes a determination as to whether a computing job has been received for processing within a cloud computing environment, such as the cloud computing system 100. It should be noted that ownership information for the task may be received in association with the computing job. Alternatively, ownership information may be stored within a database, such as the job database 112, accessible by a device executing the process 400.

When a determination is made that a computing job has been received, the process 400 partitions the computing job into prioritized tasks based upon priority information associated with the computing job at block 404. At block 406, the process 400 estimates required resources to complete each prioritized task associated with the computing job. It should be noted, that the resources required to complete each prioritized task may include 110 resources, CPU resources, or other system resources associated with a worker cloud computing device, such as the worker cloud computing device_1 106 through the worker cloud computing device_N 108. It should further be noted, that the process 400 may also determine for any task that requires multiple resources, which of the multiple resource requirements (e.g., 110 resource requirements, CPU resource requirements, etc.) is greater. As such, the process 400 may further categorize the tasks based upon resource requirements.

At block 408, the process 400 queries each worker cloud computing device for its available resources. At decision point 410, the process 400 makes a determination as to whether all responses with the available resources of each worker cloud computing device have been received. The responses received from each worker cloud computing device may further include task ownership information for each task presently being processed by each respective device.

When a determination is made that all responses with the available resources of each worker cloud computing device have been received, the process 400 identifies the highest-priority task associated with the computing job at block 412. At block 414, the process 400 determines ownership information for each task. As described above, the ownership information for the task may be received in association with the computing job. Alternatively, ownership information may be stored in association with a job database, such as the job database 112.

At block 416, the process 400 determines/identifies which worker cloud computing device, such as the worker cloud computing device_1 106 through the worker cloud computing device_N 108, has sufficient capacity to process the highest-priority task and/or available resources that match the resource requirements of the highest-priority task. It should be noted that, as appropriate for a given implementation, a cloud computing system such as the cloud computing system 100 may be configured to utilize a subset of available worker cloud computing devices to perform a majority of available work to conserve energy. Provided that performance is not degraded, work may be packed onto a smaller number of worker cloud computing devices rather than distributing work to as many worker cloud computing devices as possible. As such, energy may be saved by such an implementation.

At decision point 418, the process 400 makes a determination as to whether an ownership conflict would result from assigning the highest-priority task to the worker cloud computing device with the most available resources that match the resource requirements for the task. When a determination is made that an ownership conflict would result, the process 400 returns to block 416 to determine which of the other worker cloud computing devices has the most available resources that match the resource requirements for the task. The process 400 iterates between decision point 418 and block 416 until a worker cloud computing device has been identified that will not result in an ownership conflict by assignment of the task to the worker cloud computing device. As such, the process 400 determines whether another worker cloud computing device has available resources sufficient to meet the required resources for the highest-priority task without ownership conflict. It should be noted that, though the present example depicts block 416 preceding decision point 418, this processing order may be reversed without departure from the scope of the present subject matter.

When a determination is made at decision point 418 that an ownership conflict would not result from assigning the highest-priority task to the identified worker cloud computing device, the process 400 assigns the task to the worker cloud computing device with the highest available resources that match the required resources without ownership conflict at block 420. It should also be noted that the process 400 assigns the highest-priority associated with the computing job to the worker cloud computing device when the greater of the available resources, such as I/O resources and CPU resources, matches the greater of the I/O resources requirements and the CPU resources requirements for the highest-priority task. It should further be noted that the process 400 may further instruct each worker cloud computing device that is assigned a task to prioritize the highest-priority task among other tasks in execution by the first worker cloud computing device based upon relative priorities between the highest-priority task and the other tasks in execution by the first worker cloud computing device. As described above, for hybrid scheduling approaches, or for other scheduling approaches, task priority information associated with computing jobs may be stored within a job database, such as the job database 112, or may be transmitted in association with assigned tasks to the respective worker cloud computing devices.

At block 422, the process 400 receives updated available resources from the worker cloud computing device in response to assigning the highest-priority task associated with the computing job to the worker cloud computing device. At decision point 424, the process 400 makes a determination as to whether all tasks have been assigned.

When a determination is made at decision point 424 that all tasks have not been assigned, the process 400 returns to block 412 to identify a next highest-priority task associated with the computing job and iterates as described above. As such, the process 400 iteratively assigns remaining tasks associated with the computing job to additional ones of the group of worker cloud computing devices in decreasing order of priority in response to determining the available resources for a worker cloud computing device are sufficient to meet required resources for each of the remaining tasks without an ownership conflict. The process 400 also iteratively assigns remaining tasks associated with the computing job to additional ones of the group of worker cloud computing devices in decreasing order of priority based upon highest available resources among the additional ones of the group of worker cloud computing devices for each iteration of task assignment without causing additional ownership conflicts. It should be further noted, that at block 414, the process 400 may further determine whether the updated available resources of the worker cloud computing device, to which a task was previously assigned, are sufficient to meet required resources for the next highest-priority task associated with the computing job and may assign additional tasks to that worker cloud computing device.

As such, process 400 may assign the next highest-priority task associated with the computing job to the worker cloud computing device that has been previously assigned a task when the updated available resources for the worker cloud computing device are sufficient to meet the required resources for the next highest-priority task without ownership conflict. When the updated available resources for a worker cloud computing device that has been assigned one or more tasks are insufficient to meet the resource requirements for a given task, the process 400 may assign a task to any worker cloud computing device with available resources sufficient to meet the resource requirements for the task without creating an ownership conflict by an assignment of the task to the respective device.

When a determination is made at decision point 424 that all tasks have been assigned, the process 400 receives all results, combines the received results (e.g., performs a reduce phase of a map-reduce process), and returns the reduced results in response to the computing job request at block 426. The process 400 returns to decision point 402 to await a new computing job. It should additionally be noted that additional processing to iterate and retrieve each result from each worker cloud computing device has not been shown for ease of illustration purposes.

It should be noted that, while the present example depicts processing at block 426 to accumulate and return results, as an alternative to the present example, processing may be implemented to interleave the assigning of tasks and the receiving of results without departure from the scope of the present subject matter. Further, as appropriate for a given implementation, a process, such as the process 400, may be divided into multiple processes, such as a task assignment process/component and result receiving process/component. In such an implementation, these multiple processes/components may be distributed across multiple computing devices. Many other possibilities exist for processing and distribution of processing among devices and all are considered within the scope of the present subject matter.

As such, the process 400 receives and partitions computing jobs into prioritized tasks based upon prioritization information associated with the computing job. The process 400 also iteratively assigns tasks to worker cloud computing devices in a decreasing order of priority without causing ownership conflicts.

FIG. 5 is a flow chart of an example of an implementation of a process 500 for automated cloud workload management in a map-reduce environment for hybrid scheduling by a worker cloud computing device, such as one of the worker cloud computing device_1 106 through the worker cloud computing device_N 108, where the worker cloud computing device performs task prioritization. It should be noted that the process 500 may assume, in one implementation, that the worker cloud computing device is provided tasks that have no ownership conflict and that the master computing device 102 performs the ownership conflict prevention for this example hybrid scheduling approach. Alternatively, the process 500 may select tasks to avoid ownership conflict with any other tasks presently being processed by the respective worker cloud computing device that executes a process, such as the process 500. Many variations on processing are possible and all are considered within the scope of the present subject matter.

At decision point 502, the process 500 makes a determination as to whether a task has been received at a worker cloud computing device. It should be noted, as discussed above, that the process 500 may alternatively select tasks, such as a highest-priority task associated with the computing job, for execution by selecting the highest-priority task from a logically-centralized job database, such as the job database 112. The tasks may be selected for execution in response to determining that the available resources of the worker cloud computing device are sufficient to meet required resources for the highest-priority task without causing an ownership conflict between a new computing job and any other computing job presently being processed by the worker cloud computing device. The job database may further include a set of partitioned prioritized tasks associated with the computing job. The partitioned prioritized tasks may be prioritized based upon the priority information associated with the computing job. When a determination is made that a task has been received, the process 500 determines the priority of the task at block 504. As described above, for hybrid scheduling approaches, or for other scheduling approaches, task priority information associated with computing jobs may be stored within a job database, such as the job database 112, or may be received in association with assigned tasks.

At block 506, the process 500 determines the required resources for the task. At decision point 508, the process 500 makes a determination as to whether it has sufficient available resources (e.g., I/O resources or CPU resources, etc.) to begin execution of the task. When a determination is made that the worker cloud computing device does not presently have sufficient resources to begin execution of the task, the process 500 makes a determination at decision point 510 as to whether a lower-priority task is presently executing. When a determination is made that a lower-priority task is not presently executing, the process 500 returns to decision point 508 to await availability of resources sufficient to meet the required resources for the highest-priority task. When a determination is made at decision point 510 that the process 500 is presently executing a lower-priority task, the process 500 pauses the lower-priority task at block 512. However, though the present example depicts pausing of lower-priority tasks, it should be noted that certain implementations may be configured such that tasks are not paused without departure from the scope of the present subject matter.

Returning to the description of decision point 508, when a determination is made that resources required to execute the highest-priority task are available, or upon pausing the lower-priority task at block 512, the process 500 processes the task at block 514. At decision point 516, the process 500 makes a determination as to whether the task has been completed. When a determination is made that the task has not been completed, the process 500 returns to block 514 and iterates as described above until the task is completed.

When a determination is made at decision point 516 that the task has been completed, the process 500 resumes any paused task at block 518. At block 520, the process 500 returns any results associated with the executed task and returns to decision point 502 to await a new task assignment. It should further be noted, that additional processing to determine whether any lower-priority tasks are completed and to return results from any such tasks has been omitted for ease of illustration purposes. However, it is understood that any such processing is within the scope of the present subject matter.

As such, the process 500 receives tasks and determines a priority and required resources associated with the task. The process 500 prioritizes the task among any currently executing tasks and pauses any lower-priority tasks that are presently executing. The process 500 completes the highest-priority task and returns the results. It should further be noted that, though not depicted for ease of illustration purposes, the process 500 may further determine updated available resources in response to beginning execution of the highest-priority task. The process 500 may also further select a next highest-priority task associated with the computing job for execution upon determining that the updated available resources of the worker computing device are sufficient to meet required resources for the next highest-priority task without causing the ownership conflict.

As described above in association with FIG. 1 through FIG. 5, the example systems and processes provide automated cloud workload management in a map-reduce environment. Many other variations and additional activities associated with automated cloud workload management in a map-reduce environment are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts, or combinations of special-purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
 a memory; and
 a processor programmed to:
  retrieve a computing job from the memory;
  identify a first worker cloud computing device from a plurality of worker cloud computing devices with available resources sufficient to meet required resources for a highest-priority task associated with the computing job comprising a plurality of prioritized tasks;
  determine, based upon ownership information associated with the computing job and ownership information associated with at least one other task assigned to the first worker cloud computing device, whether an ownership conflict would result from an assignment of the highest-priority task to the first worker cloud computing device; and assign the highest-priority task to the first worker cloud computing device in response to determining that the ownership conflict would not result from the assignment of the highest-priority task to the first worker cloud computing device.

2. The system of claim 1, where the processor is further programmed to:

estimate computing resources required to complete each of the plurality of prioritized tasks; and identify the highest-priority task to assign to the first worker cloud computing device based upon priority information associated with each of the prioritized tasks and the computing resources required to complete each of the plurality of prioritized tasks.

3. The system of claim 1, where the processor is further programmed to:

determine, based upon the ownership information associated with the computing job and the ownership information associated with the at least one other task assigned to the first worker cloud computing device, that the ownership conflict would result from the assignment of the highest-priority task to the first worker cloud computing device;

identify a second worker cloud computing device with available resources sufficient to meet the required resources for the highest-priority task without causing the ownership conflict based upon the ownership information associated with the computing job and ownership information associated with at least one other task assigned to the second worker cloud computing device; and assign the highest-priority task to the second worker cloud computing device in response to determining that the second worker cloud computing device comprises the available resources sufficient to meet the required resources for the highest-priority task without causing the ownership conflict.

4. The system of claim 1, where, in being programmed to identify the first worker cloud computing device from the plurality of worker cloud computing devices with the available resources sufficient to meet the required resources for the highest-priority task associated with the computing job, the processor is programmed to:

query each of the plurality of worker cloud computing devices for available resources of that worker cloud computing device; and receive a response from each of the plurality of worker cloud computing devices with the available resources of that worker cloud computing device.

5. The system of claim 4, where the available resources of each of the plurality of worker cloud computing devices comprise one of available processor resources and available input/output (I/O) resources, and where the processor is further programmed to:

determine which of processor resource requirements and I/O resource requirements for the highest-priority task is greater; and identify the first worker cloud computing device among the plurality of worker cloud computing devices with a greatest of the one of the available processor resources and the available input/output (I/O) resources that match the determined greater of the processor resource requirements and I/O resource requirements for the highest-priority task.

6. The system of claim 1, where the processor is further programmed to:

receive updated available resources from the first worker cloud computing device in response to assigning the highest-priority task to the first worker cloud computing device;

determine which of the first worker cloud computing device and other of the plurality of worker cloud computing devices has a greatest resource availability to meet required resources for a next highest-priority task associated with the computing job;

determine, based upon the ownership information associated with the computing job and ownership information associated with at least one other task assigned to the worker cloud computing device determined to have the greatest available resources, whether an additional ownership conflict would result from an assignment of the next highest-priority task to that worker cloud computing device; and assign the next highest-priority task to the worker cloud computing device determined to have the greatest resource availability to meet the required resources for the next highest-priority task in response to determining that the additional ownership conflict would not result from the assignment of the next highest-priority task to that worker cloud computing device.

7. The system of claim 1, where the processor is further programmed to:

iteratively assign remaining tasks associated with the computing job to additional ones of the plurality of worker cloud computing devices in decreasing order of priority and based upon highest available resources among the additional ones of the plurality of worker cloud computing devices for each iteration of task assignment without causing additional ownership conflicts.

8. A computer program product comprising:

a computer readable storage medium including computer readable program code, where the computer readable storage medium is not a transitory signal per se and where the computer readable program code when executed on a computer causes the computer to:

identify a first worker cloud computing device from a plurality of worker cloud computing devices with available resources sufficient to meet required resources for a highest-priority task associated with a computing job comprising a plurality of prioritized tasks;

determine, based upon ownership information associated with the computing job and ownership information associated with at least one other task assigned to the first worker cloud computing device, whether an ownership conflict would result from an assignment of the highest-priority task to the first worker cloud computing device; and assign the highest-priority task to the first worker cloud computing device in response to determining that the ownership conflict would not result from the assignment of the highest-priority task to the first worker cloud computing device.

9. The computer program product of claim 8, where the computer readable program code when executed on the computer further causes the computer to:

estimate computing resources required to complete each of the plurality of prioritized tasks; and identify the highest-priority task to assign to the first worker cloud computing device based upon priority information associated with each of the prioritized tasks and the computing resources required to complete each of the plurality of prioritized tasks.

10. The computer program product of claim 8, where the computer readable program code when executed on the computer further causes the computer to:
   determine, based upon the ownership information associated with the computing job and the ownership information associated with the at least one other task assigned to the first worker cloud computing device, that the ownership conflict would result from the assignment of the highest-priority task to the first worker cloud computing device;
   identify a second worker cloud computing device with available resources sufficient to meet the required resources for the highest-priority task without causing the ownership conflict based upon the ownership information associated with the computing job and ownership information associated with at least one other task assigned to the second worker cloud computing device; and
   assign the highest-priority task to the second worker cloud computing device in response to determining that the second worker cloud computing device comprises the available resources sufficient to meet the required resources for the highest-priority task without causing the ownership conflict.

11. The computer program product of claim 8, where, in causing the computer to identify the first worker cloud computing device from the plurality of worker cloud computing devices with the available resources sufficient to meet the required resources for the highest-priority task associated with the computing job, the computer readable program when executed on the computer causes the computer to:
   query each of the plurality of worker cloud computing devices for available resources of that worker cloud computing device; and
   receive a response from each of the plurality of worker cloud computing devices with the available resources of that worker cloud computing device.

12. The computer program product of claim 11, where the available resources of each of the plurality of worker cloud computing devices comprise one of available processor resources and available input/output (I/O) resources, and where the computer readable program code when executed on the computer further causes the computer to:
   determine which of processor resource requirements and I/O resource requirements for the highest-priority task is greater; and
   identify the first worker cloud computing device among the plurality of worker cloud computing devices with a greatest of the one of the available processor resources and the available input/output (I/O) resources that match the determined greater of the processor resource requirements and I/O resource requirements for the highest-priority task.

13. The computer program product of claim 8, where the computer readable program code when executed on the computer further causes the computer to:
   receive updated available resources from the first worker cloud computing device in response to assigning the highest-priority task to the first worker cloud computing device;
   determine which of the first worker cloud computing device and other of the plurality of worker cloud computing devices has a greatest resource availability to meet required resources for a next highest-priority task associated with the computing job;
   determine, based upon the ownership information associated with the computing job and ownership information associated with at least one other task assigned to the worker cloud computing device determined to have the greatest available resources, whether an additional ownership conflict would result from an assignment of the next highest-priority task to that worker cloud computing device; and
   assign the next highest-priority task to the worker cloud computing device determined to have the greatest resource availability to meet the required resources for the next highest-priority task in response to determining that the additional ownership conflict would not result from the assignment of the next highest-priority task to that worker cloud computing device.

14. The computer program product of claim 8, where the computer readable program code when executed on the computer further causes the computer to:
   iteratively assign remaining tasks associated with the computing job to additional ones of the plurality of worker cloud computing devices in decreasing order of priority and based upon highest available resources among the additional ones of the plurality of worker cloud computing devices for each iteration of task assignment without causing additional the ownership conflicts.

15. A system, comprising:
   a communication device; and
   a processor at a worker cloud computing device programmed to:
      receive, via the communication device at the worker cloud computing device within a cloud computing environment, an indication of an available computing job comprising ownership information and priority information; and
      in response to receiving the indication of the available computing job comprising the ownership information and the priority information, the processor at the worker cloud computing device is further programmed to:
         determine available resources of the worker cloud computing device;
         determine ownership information for a task associated with another computing job presently being processed by the worker cloud computing device; and
         select a highest-priority task associated with the computing job for execution in response to determining that the available resources of the worker cloud computing device are sufficient to meet required resources for the highest-priority task without causing an ownership conflict between the computing job and the other computing job presently being processed by the worker cloud computing device.

16. The system of claim 15, where, in being programmed to select the highest-priority task associated with the computing job for execution, the processor is programmed to select the highest-priority task from a centralized job database comprising a plurality of partitioned prioritized tasks associated with the computing job, where the partitioned prioritized tasks are prioritized based upon the priority information.

17. The system of claim 15, where the processor is further programmed to:
   determine updated available resources in response to beginning execution of the highest-priority task; and
   select a next highest-priority task associated with the computing job for execution upon determining that the updated available resources of the worker computing device are sufficient to meet required resources for the next highest-priority task without causing the ownership conflict.

18. The system of claim 15, where the processor is further programmed to:
   determine that the task associated with the other computing job presently being processed by the worker cloud computing device comprises a priority lower than the highest-priority task;
   pause the lower-priority task presently being processed by the worker cloud computing device; and
   resume execution of the lower-priority task in response to determining that execution of the highest-priority task has completed.

19. A computer program product comprising:
   a computer readable storage medium including computer readable program code, where the computer readable storage medium is not a transitory signal per se and where the computer readable program code when executed on a computer at a worker cloud computing device causes the worker cloud computing device to:
      receive, at the worker cloud computing device within a cloud computing environment, an indication of an available computing job comprising ownership information and priority information; and
      in response to receiving the indication of the available computing job comprising the ownership information and the priority information, the computer readable program code when executed on the computer at the worker cloud computing device further causes the worker cloud computing device to:
         determine available resources of the worker cloud computing device;
         determine ownership information for a task associated with another computing job presently being processed by the worker cloud computing device; and
         select a highest-priority task associated with the computing job for execution in response to determining that the available resources of the worker cloud computing device are sufficient to meet required resources for the highest-priority task without causing an ownership conflict between the computing job and the other computing job presently being processed by the worker cloud computing device.

20. The computer program product of claim 19, where, in causing the computer to select the highest-priority task associated with the computing job for execution, the computer readable program code when executed on the computer at the worker cloud computing device causes the worker cloud computing device to select the highest-priority task from a centralized job database comprising a plurality of partitioned prioritized tasks associated with the computing job, where the partitioned prioritized tasks are prioritized based upon the priority information.

21. The computer program product of claim 19, where the computer readable program code when executed on the computer at the worker cloud computing device further causes the worker cloud computing device to:
   determine updated available resources in response to beginning execution of the highest-priority task; and
   select a next highest-priority task associated with the computing job for execution upon determining that the updated available resources of the worker computing device are sufficient to meet required resources for the next highest-priority task without causing the ownership conflict.

22. The computer program product of claim 19, where the computer readable program code when executed on the computer at the worker cloud computing device further causes the worker cloud computing device to:
   determine that the task associated with the other computing job presently being processed by the worker cloud computing device comprises a priority lower than the highest-priority task;
   pause the lower-priority task presently being processed by the worker cloud computing device; and
   resume execution of the lower-priority task in response to determining that execution of the highest-priority task has completed.

* * * * *